Dec. 28, 1937.  K. NORRIS  2,103,866
HAND CART
Filed Oct. 19, 1936
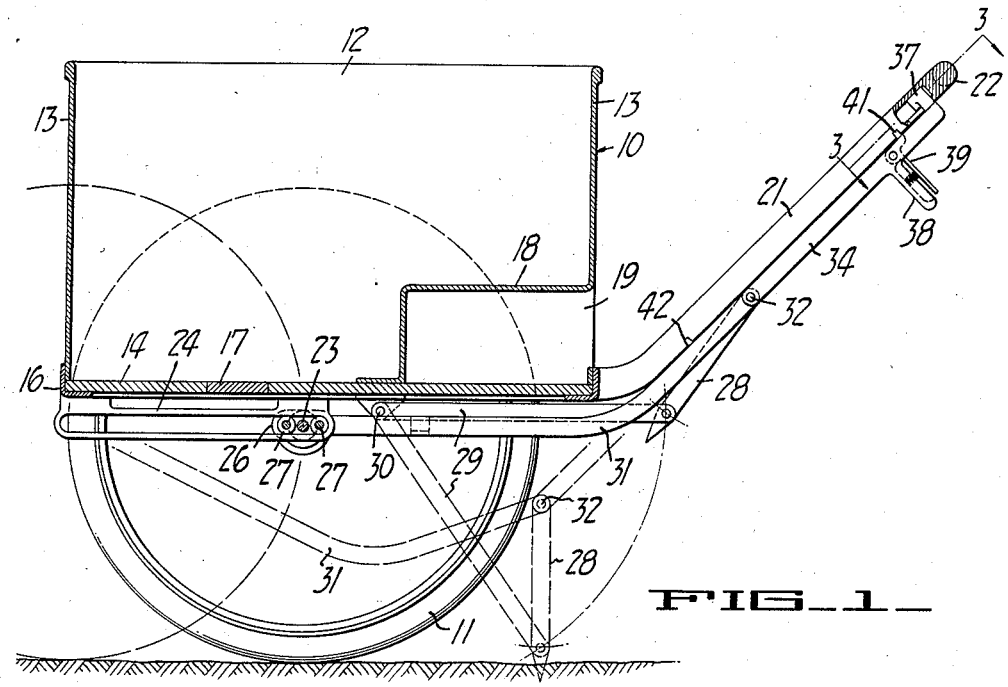
FIG_1_
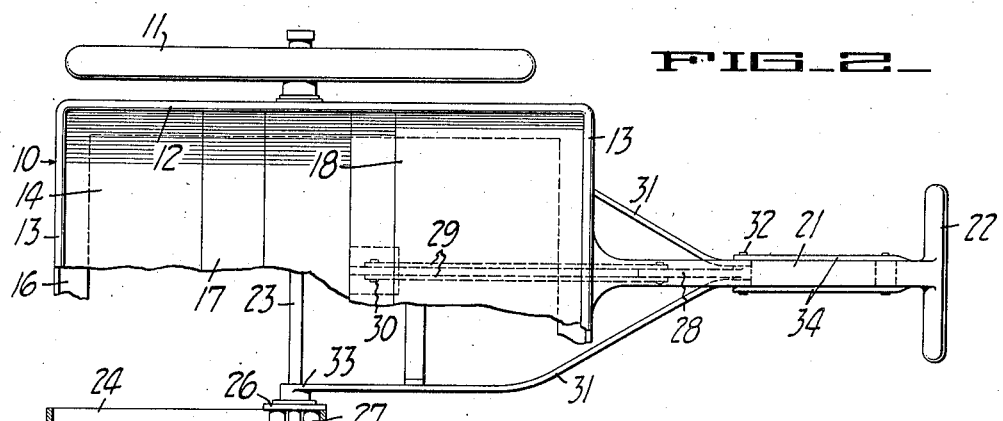
FIG_2_
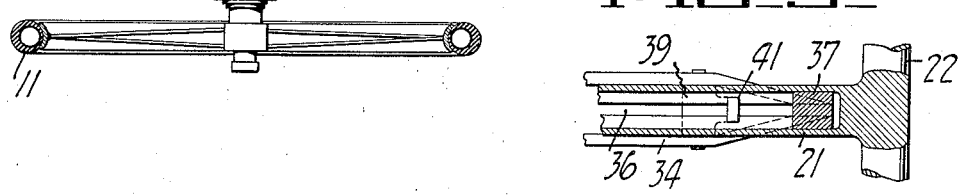
FIG_3_
INVENTOR.
Kathleen Norris
BY Paul O. Fleher
ATTORNEY.

Patented Dec. 28, 1937

2,103,866

UNITED STATES PATENT OFFICE 2,103,866

HAND CART

Kathleen Norris, Palo Alto, Calif.

Application October 19, 1936, Serial No. 106,278

3 Claims. (Cl. 280—51)

This invention relates generally to the construction of hand carts, and is designed particularly as a nursery cart for infants or small children.

The object of the invention is to provide a vehicle for conveniently carrying groups of infants or small children, as for example from a dwelling to a near-by playground. Conventional vehicles for infants, such as the common baby buggies or small hand wagons, are not suited for this purpose, because of their limited carrying capacity, and because they will not safely accommodate a mixed group of children of varying ages. I have found that a hand cart will admirably serve this purpose, provided that the body is suitably proportioned.

Referring to the drawing:

Fig. 1 is a side elevational view, in cross section, illustrating a cart incorporating the present invention.

Fig. 2 is a plan view of the cart shown in Fig. 1, a part of the cart body being broken away to expose certain parts.

Fig. 3 is a cross sectional detail taken along the line 3—3 of Fig. 1.

In the cart as illustrated in the drawing, the body 10 is provided with ground-engaging wheels 11, of the rubber tired type. A simple rectangular shaping of the body can be used, with the side and end walls 12 and 13 respectively, being of suitable height. The floor 14 is shown resting upon a framing ledge 16, and can include a removable slat 17 to facilitate cleaning. A platform 18 is shown built in one end of the body, and the interior of this platform may be accessible through opening 19, to serve as a carrier of miscellaneous articles. A handle extension 21 is secured to one end of the cart body, and is provided with a lateral hand grip 22.

It is feasible to provide a fixed supporting foot whereby the cart will have some measure of stability, when the supporting foot is permitted to rest upon the ground. It is preferable, however, to provide means such as will now be described, to afford such stability that it is virtually impossible for children within the cart, to upset the same, even though an adult is not holding the handle.

The wheels 11 are journalled upon the ends of shaft 23, and instead of rigidly fixing this shaft to the under side of the cart body, it is slidable between two positions. Thus a pair of tracks 24 are mounted upon the under side of the cart body, and they extend from the intermediate part of the cart, to the forward end. These tracks are engaged by carriages 26, which can be provided with small rollers 27 to minimize friction. Carriages 26 in turn serve as a mounting for the shaft 23. Thus the shaft 23 together with the wheels 11, can be shifted relative to the cart body, from a position such as shown in Fig. 1 in which the axis of the shaft is approximately below the center of gravity of the cart body, to a position such as shown in dotted lines in this figure, in which the axis of the shaft 23 is at the forward end of the body.

In conjunction with the arrangement described above, for enabling a shifting of the shaft relative to the body, I also provide a ground engaging member 28, which is retractable. The actuating means for the ground engaging member 28, also serves as an actuating means for fixing sliding movement of shaft 23. As an example of suitable actuating means, which can be conveniently operated, I have shown a link 29, having its one end pivotally connected to member 28, and its other end provided with pivotal connection 30 to the bottom side of the cart body. Another pair of links 31 is provided with a pivotal connection 32 at their rear ends, to the upper end of ground engaging member 28, and the rear ends of these links 31 are provided with pivotal connections 33, to the shaft 23. The contour of links 31, as viewed in plan, is illustrated in Fig. 2. The contour as viewed laterally, is shown in Fig. 1. Note that as viewed in Fig. 1, the links 31 are bent to an angle corresponding approximately to the angle made by the handle extension 21, to the bottom plane of the cart body.

The pivotal connection 32, between links 31 and the upper end of the ground engaging member 28, also serves as a pivotal connection between these parts and the bars 34. These bars extend parallel to the handle extension 21, along the underside of the same, and they are slidably retained in some suitable fashion to the handle. The detail illustrated makes use of a tubular handle extension with the underside of the extension provided with a longitudinal slot 36. The interior of the handle extension is engaged by the sliding guide 37, which is attached to the upper ends of the bars 34. These bars are also shown carrying a handle 38, in conjunction with a pivoted latch 39. This latch is engageable with either one of two slots 41 and 42, which are provided on the under side of the handle extension 21.

Operation of the cart as described above, can be outlined briefly as follows: When the cart is being used for carrying children, the operating parts occupy the positions shown in full lines in Fig. 1, with the ground engaging member 28 retracted, and the shaft 23 positioned generally below the center of gravity of the cart body. When it is desired to permit the cart to stand, the latch 39 is released and handle 38 forced downwardly along the handle extension 21, until the latch 39 can be engaged with slot 42. This operation will serve to project the ground engaging member 28 to the position shown in dotted lines in Fig. 1, and to simultaneously slide the shaft 23 to the forward end of the cart.

The cart can be variously proportioned to suit different requirements. The height of the body should be such that small children may stand within the cart, and retain a grip upon the upper edges of the sides. In practice the height of about 20 inches has been found satisfactory, with a length in the neighborhood of three feet, and a width in the neighborhood of 20 inches. The wheels 11 should be of a diameter to retain the cart body at a convenient height, as for example a diameter in the neighborhood of 30 inches.

I claim:

1. In a cart, a cart body, a handle extending from one end of the body, a shaft extending laterally across the body, a pair of wheels carried by the ends of the shaft, means for movably mounting the shaft near the underside of the body whereby the axis of the shaft can be shifted from a position near the center of gravity of the cart, to a position adjacent one end of the cart, a retractable ground engaging support for the other end of the body, and manually operable means for simultaneously actuating both the retractable support and for moving the shaft between said two positions.

2. In a cart, a cart body, a shaft extending laterally across the underside of the body, a pair of wheels carried by the ends of the shaft, means for slidably mounting the shaft on the underside of the body whereby the axis of the shaft can be shifted from a position near the center of gravity of the cart, towards one end of the cart, a handle extending from the other end of the cart, a retractable ground engaging support for the other end of the body, and manually operable means serving to simultaneously actuate the retractable support and to effect sliding of said shaft between said two positions, whereby when said support is projected to engage the ground said shaft is shifted to position adjacent said one end of the cart body, to retain the cart body against accidental tipping.

3. In a cart, a cart body, a handle extending from one end of the body, a shaft extending laterally across the body, a pair of wheels carried by the ends of the shaft, means for movably mounting the shaft near the underside of the body whereby the axis of the shaft can be shifted from a position near the center of gravity of the cart, to a position adjacent one end of the cart, a retractable ground engaging support for the other end of the body, and manually operable means for actuating both the retractable support and for moving the shaft between said two positions, said last means including a single operating handle movable between limiting positions to effect both actuation of the retractable support and movement of said shaft between said two positions.

KATHLEEN NORRIS.